United States Patent [19]

Lenz

[11] 4,364,695

[45] Dec. 21, 1982

[54] CARVING MACHINE WITH AUXILIARY FRAME

[75] Inventor: John O. Lenz, Coon Rapids, Minn.

[73] Assignee: Kurt Manufacturing Company, Inc., Minneapolis, Minn.

[21] Appl. No.: 272,709

[22] Filed: Jun. 11, 1981

Related U.S. Application Data

[62] Division of Ser. No. 124,471, Mar. 3, 1980, abandoned.

[51] Int. Cl.³ .............................................. B23K 1/16
[52] U.S. Cl. ................................ 409/103; 144/144 R; 248/647; 248/676; 248/678; 403/297; 403/357; 409/93; 409/108; 409/121; 409/124
[58] Field of Search .................. 409/93, 85, 134, 135, 409/108, 124, 121, 107, 109; 51/356, 261; 144/144 R; 142/7; 403/297, 357; 211/175, 194; 248/647, 676, 678

[56] References Cited

U.S. PATENT DOCUMENTS

| | | | |
|---|---|---|---|
| 477,229 | 6/1892 | Rohlmann | 144/144 R X |
| 571,535 | 11/1896 | Lochman | 409/108 X |
| 701,903 | 6/1902 | Lochman | 409/93 |
| 1,721,015 | 7/1929 | Galbraith | 409/108 |
| 2,018,763 | 10/1935 | Kirby | 409/108 X |
| 2,093,009 | 7/1937 | Galbraith | 409/93 |
| 2,343,875 | 3/1944 | Schwartz | 409/135 |
| 2,609,582 | 9/1952 | Kindorf et al. | 403/387 X |
| 2,937,832 | 5/1960 | Treber | 248/678 |
| 3,484,830 | 12/1969 | Wagner et al. | 403/297 X |
| 3,620,558 | 11/1971 | MacMillan | 403/297 X |
| 3,848,747 | 11/1974 | Thompson | 211/194 |
| 4,078,474 | 3/1978 | Laskowski | 144/144 R X |
| 4,084,483 | 4/1978 | Walker | 409/108 |
| 4,104,000 | 8/1978 | Fleischmann | 403/297 X |
| 4,146,341 | 3/1979 | Smith | 403/297 X |
| 4,227,557 | 10/1980 | Allen | 409/124 |
| 4,288,185 | 9/1981 | Lenz | 409/121 |

FOREIGN PATENT DOCUMENTS

| | | | |
|---|---|---|---|
| 2520520 | 5/1975 | Fed. Rep. of Germany | |
| 2458287 | 6/1976 | Fed. Rep. of Germany | 248/676 |
| 931134 | 7/1963 | United Kingdom | 403/387 |

OTHER PUBLICATIONS

Kurt Manufacturing Co. Brochure on Master Carver.
Kurt Manufacturing Co. Brochure on Northstar II Carver.

Primary Examiner—William R. Briggs
Attorney, Agent, or Firm—Kinney, Lange, Braddock, Westman and Fairbairn

[57] ABSTRACT

A carving machine which has a tubular framework that allows easy attachment of one or more supplemental frames and additional carving spindles to the base frame. The length of the machine frame also can be extended very easily to accommodate longer workpieces. The carver includes individual motors driving the carving tools. The motors are mounted in housings provided with vacuum attachments for inducing a flow of cooling air for the individual motors. The housings also are sound deadened to reduce the noise level.

4 Claims, 9 Drawing Figures

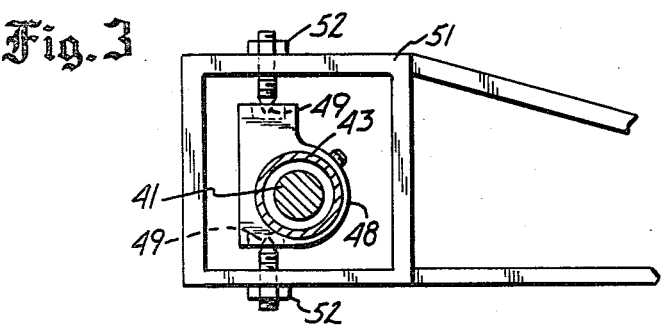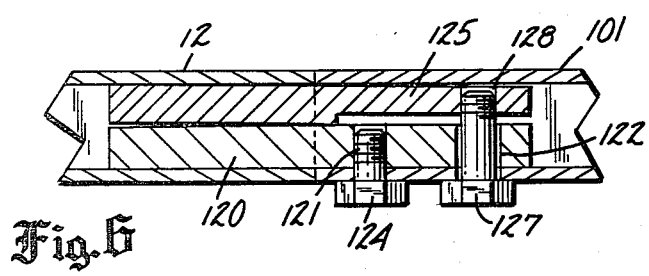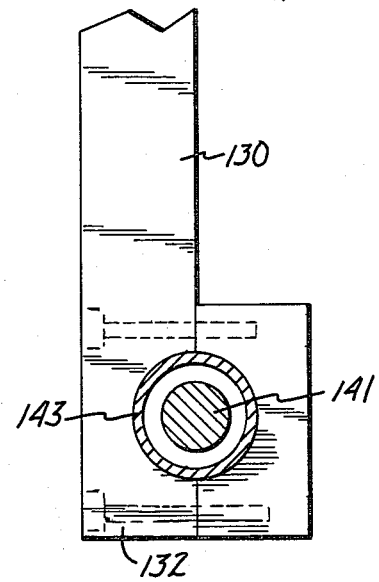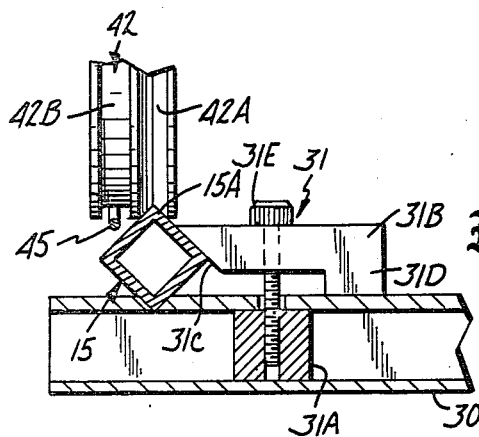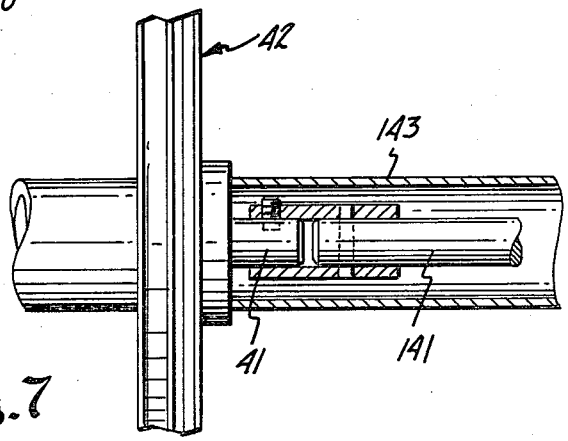

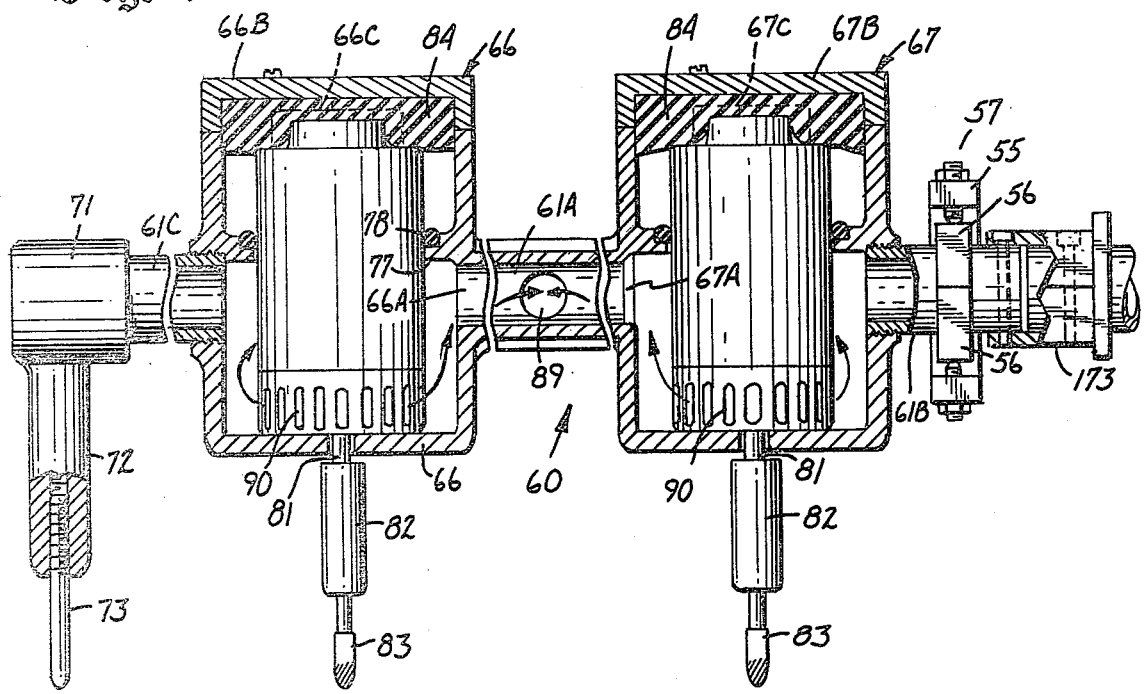
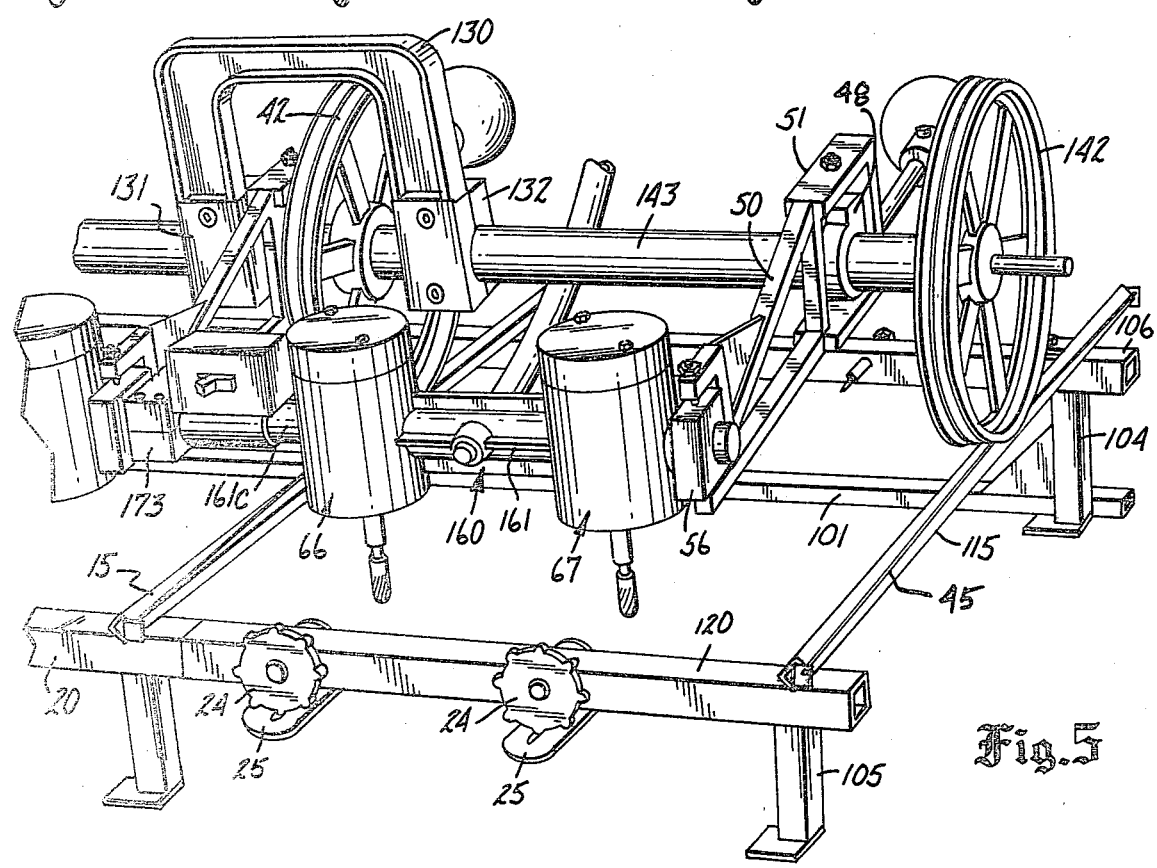

CARVING MACHINE WITH AUXILIARY FRAME

This is a division of application Ser. No. 124,471, filed Mar. 3, 1980, now abandoned.

BACKGROUND OF THE INVENTION

1. Field of the Invention

The present relates to carving machines.

2. Prior Art

In the prior art various types of light frame carving machines have been advanced. For example, U.S. Pat. No. 4,078,474 shows a square tube frame utilizing one edge of the frame members as rails for guiding pulleys to stabilize a duplicator assembly. Cables are wrapped over the pulleys and fastened to opposite ends of the rails for keeping the duplicator in proper orientation.

Additionally, mechanical type spindle lock apparatus has been utilized in woodworking machines, as shown for example in U.S. Pat. No. 477,229 which discloses an attachment for a carving machine.

Additionally, U.S. Pat. No. 1,721,015 shows a multiple spindle carving machine utilizing stabilizing pulleys on the ends of the shaft on which the carving arms are mounted, and with cables that wrap over the pulleys for keeping the parts properly aligned.

The assignee of the present application has manufactured multiple spindle machines known as the Kurt Master Carver, and the Kurt Northstar II Carver. These devices are multiple spindle machines which have counterbalanced arms for supporting the working tools. The tools have the necessary degrees of freedom of movement for these dimensional carving.

SUMMARY OF THE INVENTION

The present invention relates to a carving machine which has individually driven motors for driving each of the carving tools, and a tracing or stylus station positioned adjacent to and controlling the tool movement. The motors are mounted on arms which in turn are pivotally mounted about the necessary axes to achieve the degrees of freedom of movement for satisfactory carving. The individual motors are in housings which are cooled with a vacuum drawn through them, the housings are sealed and sound deadened to reduce the sound of the motors.

Additionally, the frame is made up of tubular members which may be joined to other frame membrs in order to increase the size of the bed, in order to provide for more or longer workpieces. The fastening devices hold the frame members securely and properly aligned. Auxiliary frames adding additional carving spindles can be attached to the basic frame. As shown each auxiliary frame carries two additional motors and carving tools which will be operated from the tracing stylus on the main frame. One to three auxiliary frames can be added side by side with the basic frame to actually add on up to six additional spindles without losing accuracy.

BRIEF DESCRIPTION OF THE DRAWINGS

FIG. 3 is a sectional view taken as on line 3—3 in FIG. 2;

FIG. 4 is a fragmentary sectional view taken as on line 4—4 in FIG. 2;

FIG. 4A is a vertical sectional view of two individual motor housings showing the internal construction thereof;

FIG. 5 is a perspective view of an auxiliary, add on frame assembly adjacent to the frame shown in FIGS. 1 and 2;

FIG. 6 is a sectional view showing the internal clamp means for holding the frame sections of the main and auxiliary frames in proper relationship;

FIG. 7 is a fragmentary view of the junction of the mounting shaft and outer tube for the main and auxiliary frames shown in FIG. 5; and FIG. 8 is a sectional view of a support tube on an auxiliary frame shown in FIG. 5, illustrating a clamp member used for securing aligning tubes together.

DESCRIPTION OF THE PREFERRED EMBODIMENTS

Figure 1:
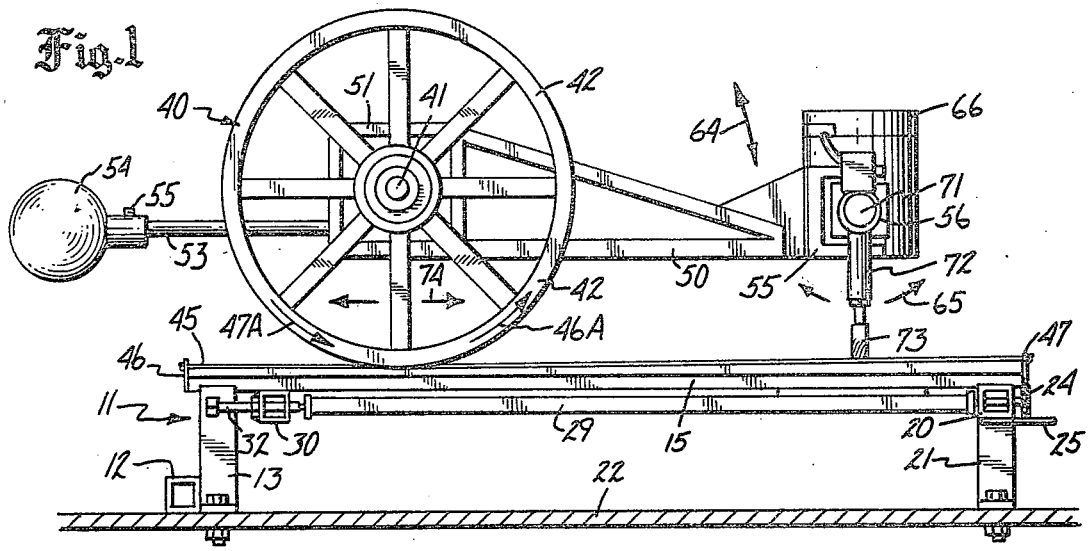
FIG. 1 is a side elevational view of a carving machine having a frame and motor mounting means made according to the present invention installed thereon.

The basic frame assembly 11 for the carving machine includes a rear cross member 12, which as shown is a square tube. The rear cross member has a pair of spaced apart upright legs 13 thereon, each of which has a notch at the upper end utilized for receiving the edge or corner of one of a pair of support rails 15,15. The rails 15 also are square tubes, as shown, placed cornerwise or edgewise so that the upper edge of each rail is formed by one edge or corner of the rails 15. The rails 15 extend parallel to each other and at the opposite end of the rails 15 from cross member 12 there is a front cross member 20. The cross member 20 is a rectangular tube, which has suitable notches in its upper wall or side at proper locations to receive the lower corners of the rails 15, respectively. The front cross piece 20 is supported on upright front posts 21. The frame members are welded to form the frame assembly, and the posts 21 and 13 can be fastened onto a suitable base member 22, such as a table top. Note that the rear frame cross member is positioned adjacent the table top so the space between rails 15 is unobstructed at the rear of the frame.

The front cross member 20 as shown has three work holding spindle assemblies indicated generally at 23 rotatably mounted thereon in a suitable manner. For example, the spindle assemblies each can have cogged indexing wheels 24 thereon (the spindles pass through the front beam or frame member 20) and the cogs or lugs on the periphery of the indexing wheels 24 mate with a spring loaded latch tongue 25. Each tongue has an aperture which will receive and hold one of the cogs of its associated indexing wheel. Workpieces which are held on these spindles 23 can be thus indexed as desired into a plurality of distinct positions about the rotational axis of the spindles. The spindles 23 are thus detented and indexed in individual positions and when the springs 25 are released to clear the cogs and the wheels 24 are manually rotated.

Figure 2:
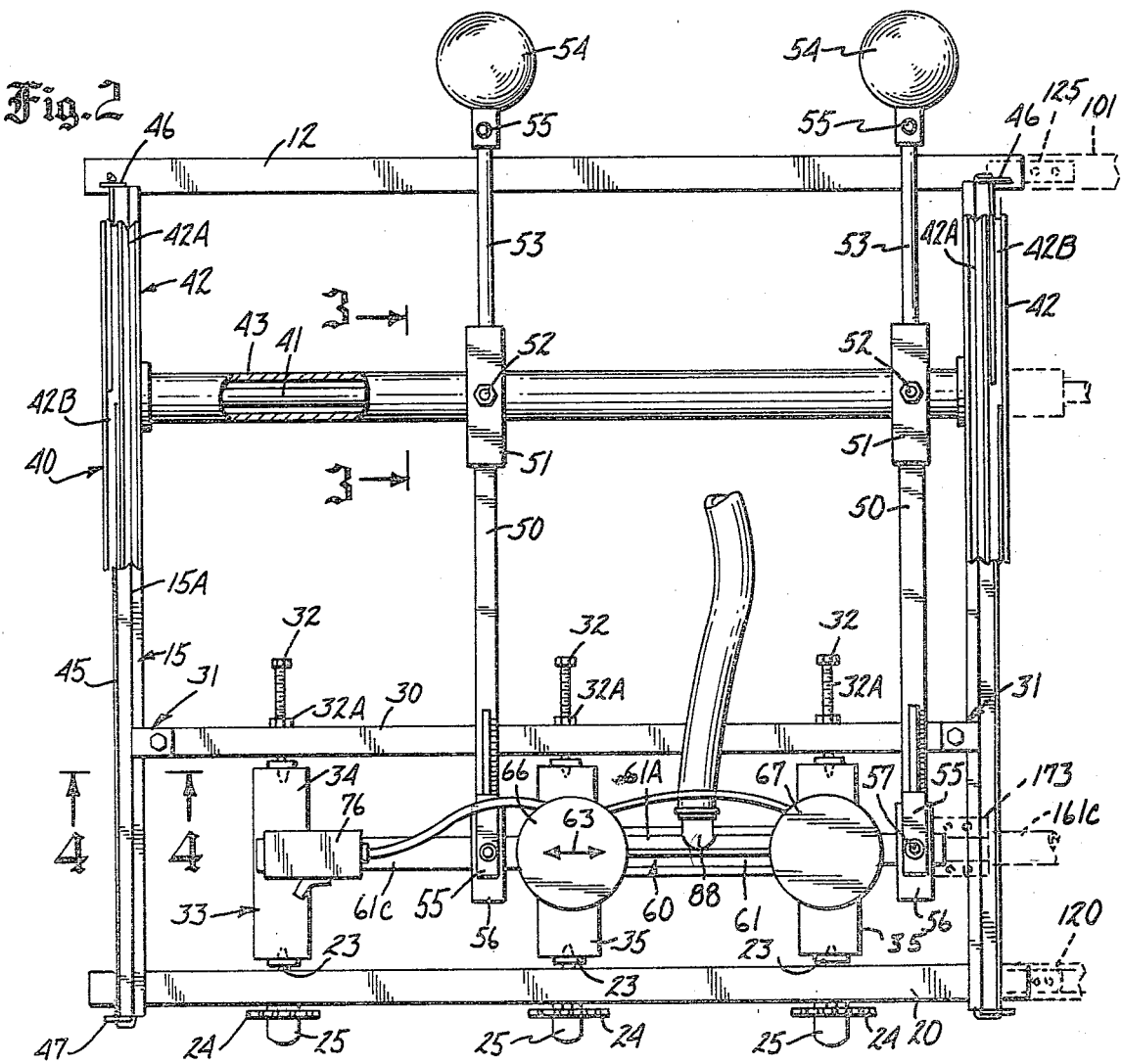
FIG. 2 is a top plan view of the device of FIG. 1 with a workpiece table shown in FIG. 1 replaced.

A cross or support bar 30 is held in place on the rails 15 parallel to the front cross member 20 through suitable clamp members 31. The cross bar 30 is the rear support for workpieces 35 shown in FIG. 2 or for a work table panel 29 as shown in FIG. 1. A plurality of rear retaining centering spindles 32 are mounted on cross member 30 and they align with the axes of the spindles 23. The rear spindles are mounted through nuts 32A which are welded to the cross bar 30. The spindles 32 may thus be threaded toward or away from spindles 23 to engage or release members positioned between the spindles. First, as shown in FIG. 2 at a tracing station indicated generally at 33, a workpiece pattern represented schematically at 34 is held between the aligning spindles 23 and 32 at this station, while individual workpieces indicated generally at 35 are held at the two work stations for carving.

The clamps 31 are made to hold a cross bar 30 securely without interfering with the upper edge of each of the rails 15, as shown in FIG. 4. The cross bar 30 may be moved along the rails 15 and clamped in place. The cross bar 30 can be moved rearwardly to adjacent the legs 13 as shown in FIG. 1 and the three front spindles 23, and the three rear spindles 32 are used simultaneously to support a table or panel support 29. The panel extends all the way from front to rear and from side to side between rails 15. The panel is used for relief carving, such as wall plaques. The pattern is merely supported on the top of the panel at station 33, and the workpieces are placed on top of the panel 29 aligning with the carving spindles.

The clamp for the cross bar 30 as shown in FIG. 4 includes an insert or plug 31A which is inserted into the interior of cross bar 30, which as shown is a square tube, and an L shaped clamp bar 31B is positioned so that one end of it which is beveled as at 31C engages one surface of the respective rails 15. A leg 31D of lug 31B rests against the upper surface of the support bar 30. As shown, the bar 30 is notched on its upper side as at 30A so that it will receive the lower longitudinal corner of the respective rail 15 to hold the bar in proper position. By tightening bolt 31E that is threaded into the plug 31A, the clamp bar 31B forces surface 31C against one surface of the rail 15, and forces the rail down into the notch 30A on cross bar 30. This holds each of the ends of the cross bar 30 securely in position and also serves to insure that the cross bar 30 is perpendicular to the rails 15. The notches 31A are milled precisely to provide the seats for the rails. Thus the cross bar 30 is also held parallel to front cross member 20. When bolts 31E of both clamps 31 are loosened the cross bar 30 can be slid to any desired position along rails 15.

The carving units are mounted on the main frame, and as shown in the present instance, there are two work stations for the workpieces 35, in addition to tracing station 39, which has a stylus member that follows a pattern 34.

The carving spindle arms and support assemblies illustrated generally at 40 as shown have a main cross shaft 41 that extends across the machine and is rotatably mounted inside a tube 43. At opposite ends of the shaft 41 there are a pair of grooved support wheels or pulleys 42 drivably mounted on the shaft. These pulleys 42 as shown in FIGS. 2 and 4 have V shaped grooves 42A that fit over the longitudinally extending edge or corner portions 15A of each of the rails 15, and thus the support wheels 42 are guided along these rails 15 for movement in longitudinal direction of the rails. The outer tube 43 is rotatably mounted around the shaft on suitable bushings which permit the tube 43 and shaft 41 to rotate freely relative to each other.

The support wheels 42 in addition to having the grooves 42A which ride on the edges 15A of the rails have grooves 42B over which cables shown at 45 are wrapped, in a single turn. Each of the cables has one end mounted to the rear of rail 15 adjacent the rear cross member on a suitable bracket that is shown only schematically at 46, and the opposite end of each cable is mounted in a suitable bracket 47 at the front end of the rails 15. The cables are wrapped once around the wheels 42, and are retained from slipping relative to the wheels by suitable means, as shown, by threading the cable through openings in the wheels. The cable portion leading to bracket 46 is wrapped around the front of the wheels as indicated by the arrow 46A. The cables wrap all the way around over the wheels and come off the wheels at the rear side and extend in the direction as indicated by arrow 47A, and then extend to be fastened to the front bracket 47.

The cables on each of the wheels 42 serve to keep the cross shaft 41, and the tube 43 that surrounds the cross shaft, precisely perpendicular to the axis of the rails and prevent the cross shaft from shifting on one rail relative to the other. The cables wrap and unwrap from the wheels simultaneously as the wheels roll along the rails.

The tube 43 carries a pair of support arms 50. Each of the support arms 50 has a box-like hub 51 that surrounds the tube (the tube 43 is slid through the box before assembly) and the hubs or boxes 51 are held axially from shifting relative to the tube through the use of top and bottom pivot screws 52 which are threaded through the respective portions of the hub 51 and which have ends which engage and are supported by bearings 49 at the top and bottom of a collar 48 for each arm. The collars 48 are held in place on tube 43 with set screws so they can be adjusted for precise alignment. The arms 50 thus may pivot about the axis of the screws 52 on bearings.

Additionally, each hub 51 has a shaft 53 extending toward the rear of the frame and a counterweight 54 is mounted on the end of each of the arms with suitable adjusting collar means 55 so that the counterweights can be slid fore and aft on shafts 53 to suitably counterbalance the arms 50.

The arms 50 extend fowardly toward the front of the carving machine, and have bifurcated bearing holders 55 at their outer or forward ends. The holders 55 hold bearing blocks 56 with pivot screws 57 at the top and bottom (see FIGS. 1 and 4A). The bearing blocks 56 are split so that they can be placed around carving spindle support shaft 61 forming part of a spindle and motor housing assembly indicated generally at 60. The assembly 60, as shown, includes two motor mounting cans or housings 66 and 67 mounted together on the joining shaft sections of shaft 61. The bearing blocks 56 as shown are located in two locations along the shaft 61 (see FIG. 2), and positioned on shaft 61 and tube 43 so that the arms 50 are exactly parallel. The bearing blocks 56 can be retained with suitable shoulders on the shaft 61 so that they don't slide axially along this shaft. The pivot screws 57 and the pivot screws 52 of each of the arms form a parallel linkage with the arms, the shaft 61, and the tube 43 so that movement in direction along the axis of the shaft 61 as indicated by the arrow 63 (FIG. 2) is permitted about these pivots. Also, the shaft 61 can be rotated about the axis of the tube 43 because the tube 43 is rotatably mounted on shaft 41. This permits up and down movement of the shaft 61 as viewed in FIG. 1, and as indicated by the arrow 64. Additionally, the shaft 61 can be rotated in bearing blocks 56 about its axis as indicated by the arrow 65.

The shaft 61, as stated, is part of an assembly including a pair of motor mounting cans or housings 66 and 67, respectively, joined together with a shaft section 61A that extends between the two housings. Shaft section 61A is tubular and forms a fluid passageway. Openings indicated at 66A and 67A, respectively, lead from the motor housings to the interior of shaft section 61A.

The opposite sides of the housings have shaft portions 61B and 61C, respectively, extending outwardly therefrom and these also are open to the interior of the motor housings 66 and 67, respectively. The bearing blocks 56 for the arms 50 are mounted on shaft sections 61B and 61C.

The shaft section 61C extends laterally from one of the arms 50, and carries a stylus mounting head 71 at its outer end. The stylus mounting head 71 has a downwardly depending probe 72, and a stylus end 73, which is used for tracing along a pattern 34 at tracing station 33. Because the stylus is fixed to the shaft section 61C, it moves with the shaft 61, and rotates, moves up and down, and moves in axial direction of the shaft 61.

Also, it should be noted that movement of the arms 50 and the shaft assembly 61 longitudinally along the rails 15 as indicated by the arrow 74 in FIG. 1 is permitted by the wheels 42, as controlled through the cables 45. Therefore movement in enough directions is accommodated for carving in three dimensions from a pattern 34 onto the workpiece 35 in a normal manner.

The motor housings 66 and 67 each mount an electric motor 75. The motors 75 may be wired in parallel and controlled by a master switch 76 shown in FIG. 2. The frames and covers of each of the motors 75 extends through an annular retaining rib 77 that is on the interior of each of the housings 66 and 67, respectively. The rib 77 has a recess for receiving a rubber ring 78, such as an O ring, that surrounds the frame and seals against the outer cylindrical surface thereof. Each motor 75 has a drive shaft 81 which extends outwardly through a provided opening in the bottom of the respective motor housing 66 or 67. Chuck members 82 for driving routing or carving tools are attached to these drive shafts in a known manner. The chucks 82 hold carving tools 83 which are rotated when the motors 75 are driven. The drive shafts 81 from the motors drive the carving tools for carving the workpieces 35.

At the upper ends of the housings 66 and 67, respectively, there are removable caps 66B and 67B, respectively, that are held in place with suitable cap screws. Foam material 84, which permits airflow therethrough bears against the upper ends of the motors 75 and urges the motors downwardly against the lower portions of their respective housings 66 and 67. Each of the caps 66B and 67B has an aperture shown in dotted lines at 66C and 67C, respectively, which provides an opening into the interior of the housings 66 and 67. This is an air inlet opening at one end of the motor, as shown, and in order to provide for adequate airflow through the motor for cooling, a vacuum pump or source indicated generally at 86 in FIG. 2 is connected to a suitable hose 87 that in turn is connected to a fitting 88 leading from an opening 89 open to the interior of tube section 61A. The vacuum causes air to flow in through the openings 66C and 67C, out through the provided apertures 90 shown at the bottom ends of the motor frames and then out through the openings 67A and 66A, opening 89 and out through the vacuum pump. In this manner, an adequate airflow can be controlled by controlling the amount of vacuum that is being drawn. The "O" rings 78 seal the air passage so airflow from the openings 66C and 67C is forced through the motors to opening 90.

The noise level of the motors 75 is substantially reduced. The motors travel at relatively high speeds but the motor housings 66 and 67 are completely enclosed, and include foam material 84 so the sound is cut down substantially. Also, the airflow tends to aid in reducing noise output through the openings 66C and 67C, because the airflow is inwardly to the housings 66 and 67.

Therefore, a novel motor housing that completely encloses the individual motors, holds them securely with elastic mounting members, includes sound deadening materials and provides for forced airflow through the frame is presented in a carving machine which has high frequency noise.

Another feature of the invention is the ability to couple on additional carving spindle assemblies similar to the assemblies shown in FIG. 1 mounted on an auxiliary frame. No additional tracing station is necessary. An auxiliary frame shown generally at 100 in FIG. 5 includes a rear cross frame member 101, a front frame member 102, and a third rail 115. The rail 115 is supported on a rear leg 104 from rear cross member 101 and a front leg 105 in the normal manner just as the other main frame was supported. Also, an additional length of cross bar 106 is added to cross bar 30.

The auxiliary or add-on frame can be positively aligned with the corresponding members on the main frame through the use of a unique internal clamp. The cross members are all square tubular members or rectangular cross section tubular members and the clamps are internal. A typical clamp to hold the auxiliary frame assembly 100 held in place is shown in FIG. 6 and includes a first clamp block 120, which comprises a solid block of material and which fits inside the abutting tubes, as shown the tube forming frame members 101 and 12. Block 120 has a threaded opening 121 adjacent one end, and also a through hole 122. A cap screw 124 passes through an opening in tube 101 and is threaded into the opening 121. The cap screw securely clamps the members 120 to tube 101. A second member 125 also fits into the end portion of tube 101 and has a relief cut in one surface so the two members 120 and 125 are spaced slightly as shown at 126, the two parts 120 and 122 are inserted into the rear frame member 101. A cap screw 127 is passed through a provided opening in the lower wall of the frame member 101, through the opening 122 and is threaded into an opening 128 in member 126. The opposite ends of members 120 and 125 are slipped into the outer end of frame member 12 before cap screw 127 is tightened and frame members 101 and 12 are abutted. Then the cap screw 127 is tightened and it will spread the ends of members 120 and 125 which are inside tube 12 to securely hold the two frame parts aligned and in assembly. The same type of fasteners are used for frame members 20 and 102 and cross bars 30 and 106. The width of the members 120 and 125 is only slightly smaller than the width of the tubes with which they are used. The fastening members 120 and 125 serve to very rigidly connect the aligning frame members so that the auxiliary frame member 100 can easily be put into position. The auxiliary frame includes a third wheel 142 which is mounted on the rail 115, with suitable cables as previously mentioned and shown at 45. Wheel 142 is attached to a shaft 141 which is suitably coupled to shaft 41 as shown in FIG. 7. A sleeve 135 can be pinned to shaft 141 and slipped over the end of shaft 41 and held there with a set screw.

An auxiliary tube 143 forms a part of the auxiliary frame assembly and is connected to tube 43 with a yoke 130 that has a first clamp 131 that clamps onto the tube 43 on the main frame, and a second clamp 132 which clamps onto a tube 143 that is on the auxiliary frame as shown in FIG. 8. The yoke 130 spans the wheel 42 and holds the tubes 143 and 43 precisely aligned. Two additional arm assemblies 40 are mounted on the tube 143 in the manner as the previous arms 50 using hubs 51 and collars 48.

The outer ends of the arms 50 of the auxiliary frame mount a modified shaft and motor housing assembly 160. The shaft assembly 161 is rotatably mounted in housings 56 and end members 55 of the arms 50 in the same manner. However, the end shaft section 161C does not include the tracing head, but rather is made to be received in a split clamp 173 that also champs the end of shaft section 61B on the main frame. Thus shaft assemblies 60 and 160 move as a unit and stylus 73 controls all four work spindles when the auxiliary frame is in place.

Additional auxiliary frames can be added to the auxiliary frame shown by use of the clamps described for holding the frame members and shafts together.

The clamp shown in FIG. 6 can also be used for extending the longitudinal length of the rails 15. If the rails are extended, longer workpieces can be accommodated. Longer cables 45 are needed if the rails are lengthened.

It should be noted that the clamps of FIG. 6 will not interfere with the wheels 42 or 142 when the rails are extended. The cap screws 124 and 127 would be positioned on the lower and outside wall of the rails to provide the clearance.

The clamps 31, as shown in FIG. 4 also clear the wheels 42 as the wheels are moved. Thus the cross bar 30 can be positioned anywhere along rails 15 or along extension to the rails without interfering with wheels 42 except at the location aligned with the legs 13 and 104.

More auxiliary frames can be added on to the right side (as viewed in FIG. 5) of the first auxiliary frame. One tracing station can thus be used for up to about eight caving tools. The add-on auxiliary frames increase the flexibility of an operator by permitting additional motors and arms to be added on at lower cost. Of course, motor controls will be added for the additional motors and the vacuum connecting to the motor housings also are used.

The clamp on the interior of the main and auxiliary frame members do not interfere with the movement of the carving arm supports but still positively align the cross members so the arms on the auxiliary frame move with the arms on the main frame. The alignment of the auxiliary rail and the arm support shaft and tube also is maintained within necessary limits.

What is claimed is:

1. In a carving machine, a frame comprising a pair of rail members, said rail members comprising rectilinear cross section tubes, each having one of its longitudinal extending corners projecting upwardly, cross members supporting said rails spaced apart in substantially parallel position, said cross members comprising rectilinear tubular members having open ends, a carving spindle arm support assembly mounted on said rails for movement therealong comprising a pair of wheels, one on each of said rails, and an auxiliary carving machine frame having a single rail thereon, and an auxiliary carving spindle and arm support assembly mounted on the auxiliary frame and having one end supported on said single rail, said auxiliary frame including auxiliary cross members which align with said cross members of the main frame when the auxiliary frame is mounted to said main frame, means to couple the end of the auxiliary carving spindle arm support assembly opposite from the single rail to the main carving spindle arm support assembly for movement therewith, and means to align and clamp cross members of the main and auxiliary frames together comprising interior plug means within the aligning tubular cross members on each of said main frame and auxiliary frames and serving to clamp said tubular cross members in alignment and in end to end relationship.

2. The combination as specified in claim 1 wherein said plug means comprise first and second plug members that together substantially fill the cross section area of the interior of the tubes of two aligning cross members, the first of said plug members being mounted to one of two aligning cross members and secured thereto with portions extending into the other of the two aligning cross members, the second of said plug members having an offset surface substantially midway in its length spaced from the surface of the first plug member, the second plug member being inserted into the other of said aligning cross members contiguous with the first plug member, and at least a portion of the second plug member being positioned within the one aligning cross member with the spaced offset surface being in the one aligning cross member, and clamp means to tend to pull the spaced surface of the second plug member toward the first plug member and thereby separate the surfaces between the first and second plug members at portions of the first and second plug members that are positioned within the other of the aligning cross members to thereby clamp the aligning cross members together.

3. The combination specified in claim 1 and an adjustable cross member mounted between said rail members of the main frame and movable along said rail members, means to clamp said adjustable cross member with respect to said rail members comprising a clamp block, said adjustable cross member having recesses defined in the surface thereof contiguous with said rail members which receive the lower longitudinal edge portion of said rail members opposite from the upper edge portion on which said wheels ride, said block having an L shaped configuration, with the one leg positioned on the upper side of said adjustable cross member and the other leg having a surface beveled to engage and mate with one of the outwardly facing side surfaces of one of the rail members, and means to threadably urge said beveled surface toward the adjustable cross member when the lower longitudinal edge of the one rail member is positioned in one recess on the adjustable cross member thereby to force the beveled surface to clamp the rail member tightly.

4. The combination as specified in claim 3 wherein said adjustable cross member is a hollow tubular member, and said threadable means includes a plug having a threaded opening positioned on the interior of said adjustable cross member and a cap screw passing through said L shaped bracket and threaded into said plug on the interior of said adjustable cross member.

* * * * *